April 23, 1963     D. J. LIMPERT     3,086,445
APPARATUS FOR MANUFACTURING PRESERVED FRUITS
Original Filed Sept. 11, 1958
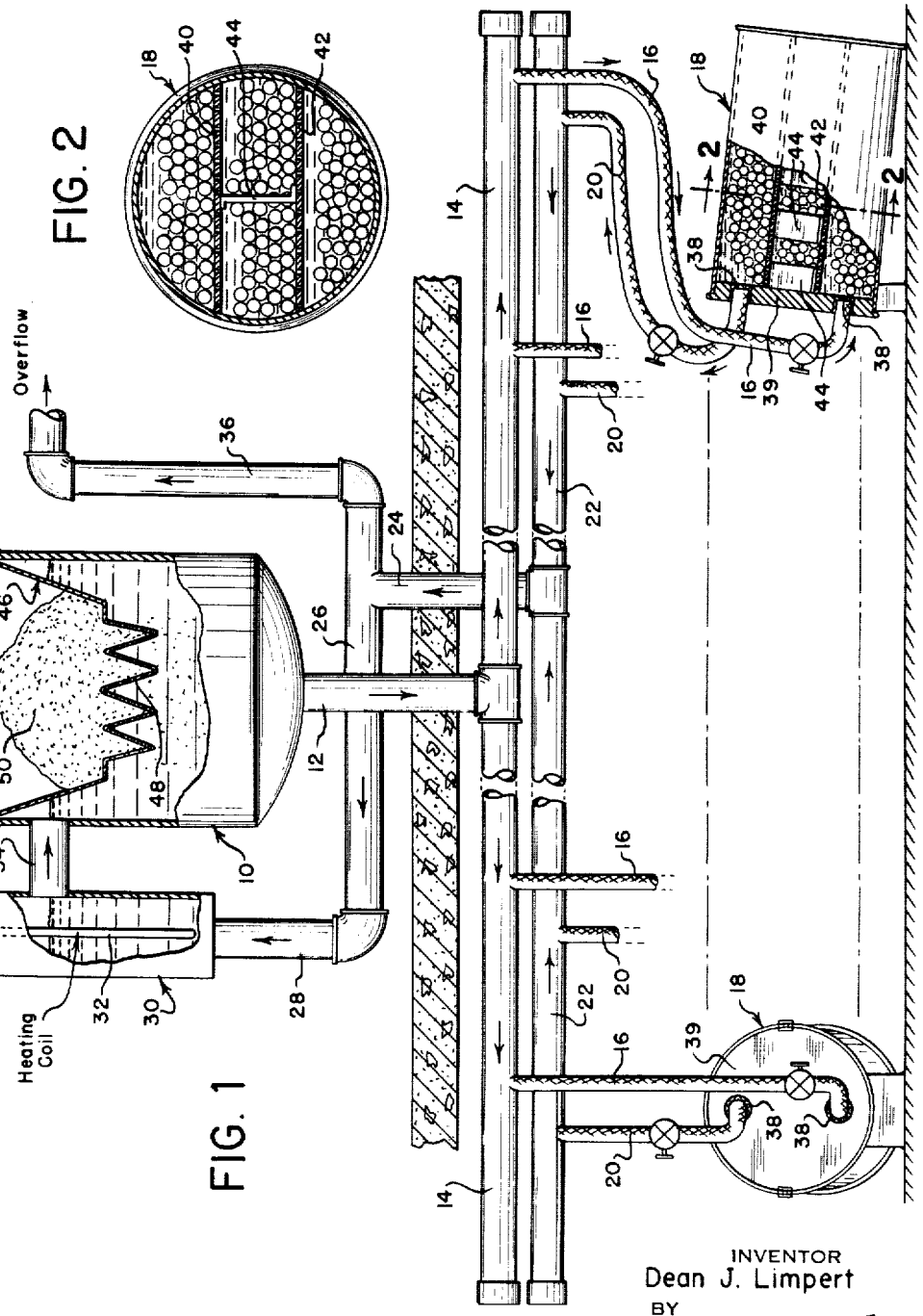
INVENTOR
Dean J. Limpert ID United States Patent Office
3,086,445
Patented Apr. 23, 1963

3,086,445
APPARATUS FOR MANUFACTURING PRESERVED FRUITS
Dean J. Limpert, Blackwood Drive, Vineland, N.J.
Original application Sept. 11, 1958, Ser. No. 760,312, now Patent No. 3,032,419, dated May 1, 1962. Divided and this application July 13, 1961, Ser. No. 123,698
7 Claims. (Cl. 99—239)

This invention relates to improvements in the manufacture of preserved fruits of the type in which sugar is stored in the fruit and more particularly to an apparatus for manufacturing maraschino cherries.

This application is a division of my U.S. Patent application Serial No. 760,312, filed September 11, 1958, now Patent No. 3,032,419, issued May 1, 1962, for "Process for Manufacturing Preserved Fruits."

A number of different processes have been proposed for the manufacture of preserved fruits, including the manufacture of maraschino cherries. In general, processes producing satisfactory products are slow and tedious and in many instances take four to six weeks to build up the required amount of sugar in the fruit. In known processes for manufacturing maraschino cherries, six weeks are required to attain the usual content of 50% sugar.

However, according to some proposals, fruit is impregnated with sugar in a short period of twenty hours or a few days by heating the fruit to boiling and using a hot concentrated hot sugar solution. In one such proposal a ton of fruit was described as being processed hot in a single container. But, such processes collapse the structure of the fruit and soften the tissues resulting in nonuniform products having an appearance of low quality, particularly with fruits of the type of cherries.

The primary object of the present invention is to provide an improved process and apparatus by which maraschino cherries and other fruits containing 50% sugar or more are produced in a relatively short period of time compared to the long periods referred to above.

A further object of the invention is to provide a process and apparatus which results in the production of a high yield of maraschino cherries and similar fruits of the highest quality which are round, plump, tender and crisp.

A further object of the invention is to provide an apparatus which will overcome the problem of crushing or mashing the fruit during processing and provide a process which will not weaken the cellular structure of cherries and other fruits.

In accordance with the invention the fruit, for example cherries, after being cleaned, pitted and made ready for treatment, according to known procedure, are contacted with an air-free water solution of sugar at ordinary room temperatures, advantageously while maintaining the cherries in relatively shallow horizontal layers. The use of such shallow layers in conjunction with other conditions of the process has been found to prevent crushing and compacting during processing. The sugar solution is circulated from a sugar dissolving chamber, where sugar is dissolved by the solution, through the cherries filled into containers, for example drums arranged in parallel, and back to the dissolving chamber. In this operation the dissolving chamber or zone contains a body of sugar solution and is preferably elevated above the drums of cherries, so that circulation is by gravity and automatic. The solution is circulated continuously through the system for a period of approximately two to three weeks to complete the deposition of the required amount of sugar in the cellular strutcure of the cherries or other fruit.

In the initial stages of the operation at least, the solution flowing from the containers of cherries to the sugar dissolving zone is preferably heated sufficiently to cause removal of the absorbed air content of the fruit which the solution collects. The solution cools to room temperature by the time it reaches the fruit in the containers.

During the circulation of the solution through the layers of fruit, a portion of the sugar content of the solution is deposited in the cellular tissues of the fruit by the process of osmosis, the sugar solution gradually replacing the normal moisture or water content of the fruit. As this replacement occurs, the solution flowing back to the sugar saturating chamber contains about 2% less sugar than the solution flowing from the chamber to the layers of cherries.

The improved process and apparatus includes other important features and conditions as described more in detail hereinafter in connection with the accompanying drawings, in which:

FIG. 1 is a diagrammatic elevational view of an apparatus arrangement suitable for use in carrying out the improved process; and FIG. 2 is a cross-sectional view taken on the line 2—2 of FIG. 1.

The apparatus shown diagrammatically in FIG. 1 comprises an open-topped chamber 10 used for dissolving granulated sugar in the solution being circulated in the system. The chamber 10 is provided at the bottom with an outlet pipe 12 which is connected into a header pipe 14, preferably at about its midpoint. A plurality of connecting pipes 16 connect into the header 14, and serve to conduct sugar solution in parallel respectively to the lower portions of processing drums 18. An outlet pipe 20 is connected into the upper portion of each drum 18, and all of these pipes are connected in parallel into a return header 22, connected by a pipe 24 into a horizontal pipe 26, which at the left, is connected by a riser pipe 28 into a heating chamber 30 provided with a heating coil or unit 32. The upper end of the chamber 32 is provided with an overflow pipe 34 opening into the upper portion of the chamber 10. The opposite end of the horizontal pipe 26 is connected into an overflow riser pipe 36 leading to a tank (not shown) and which determines the liquid level in the chamber 10.

The heads of the drums 18 or the ends of the pipes 16 and 20 opening thereinto are provided with perforated plates or screens 38 to prevent access of cherries to these pipes. The pipes 16 and 20 may be flexible and are also provided with suitable valves, not shown, so that the drums may be disconnected for emptying and refilling or for direct shipping at the end of a processing operation. Any suitable type of connections may be provided and removable heads 39 are preferably provided which clamp to the drums and facilitate the connection of filled drums into the system.

Each drum 18, as shown in detail in FIG. 2, is provided with a readily-removable internal shelf grid structure, so that the cherries therein are maintained in relatively thin layers not exceeding from 6 to 8 inches in depth, with the drums placed horizontally or on a slight incline during processing, as shown in FIG. 1. This grid structure comprises similar vertically-spaced perforated shelf plates 40 and 42 secured to and held in spaced parallel relation with respect to each other by a vertical plate or plates 44. The shelf plates 40 and 42 extend from one end of the drum to the other and to the wall on opposite sides of the drum in a symmetrical relationship, so that the body of cherries filled into each drum is divided into three superposed layers. In each instance, removable heads are secured so that the solution inlet pipe 16 opens into the drum below the lower shelf plate 42, while the outlet pipe 20 is connected into the drum above the upper shelf plate 40. The drums 18 are advantageously set preferably at a slight incline approximating 5° to the horizontal, as shown in FIG. 1, favoring the flow of the saturated solution downwardly along the bottom of the drum and the flow of the more dilute solution upwardly along the top of the drum.

In arranging the apparatus, the headers 14 and 22 are preferably mounted horizontally and are connected into a considerable number, for example forty (40) drums, each of approximately one barrel capacity. The chamber 10, having a capacity of about 75 gallons, is preferably set at an elevation with respect to the drums 18, so that there is a difference in elevation between the liquid level in the chamber 10 and the bottom of the drums of from six to fifteen feet, that is, a difference sufficient to provide a pressure head adapted to effect automatic circulation in the system. In the drawings the direction of flow is indicated by the arrows.

The drums 18 are preferably all at the same level and are conveniently located on one floor of the buliding, housing the equipment, whereas the sugar saturating chamber 10 is located on the floor above. The saturating chamber 10 is provided with a screen 46 supported on the upper rim of the chamber 10 and extending down into the chamber to a point below the overflow 34. The lower part of the screen has a corrugated formation at 48 to provide an extensive screen surface in contact with the solution. The screen 46 is of from 40 to 80 mesh and adapted to retain granulated sugar, a mount of which is shown at 50. At intervals during the process a 100-pound bag of granulated cane or beet sugar is dumped onto the screen so that a mound of sugar is always maintained on the screen 46 during a run.

In starting up the apparatus as described above, for example for the production of maraschino cherries, the forty drums, or a determined number of drums for the particular run are each filled with a predetermined weight of prepared cherries, with the drum heads removed and the removable dividers inserted, the weight being determined by the sizes and characteristics of the cherries. An important factor in filling the drums is that the drums are not filled to an extent which would crowd the cherries during processing. After the drums are filled, they are connected up into the system by securing the removable heads, then the drums are set in the manner described above and shown in FIG. 1 of the drawings. When the drums are all connected into the system, it is entirely filled with water until water runs out of the overflow through the pipe 36. At this point granulated sugar is dumped onto the screen 46, the desired flavor and coloring materials are placed in the chamber 10 and the heater 32 is turned on.

The sugar placed on the screen 46 begins to dissolve through the screen and circulation in the system commences. Since the sugar solution as formed is more dense than the surrounding water, it slowly settles and flows through the pipes 12, 14 and 16 to the drums filled with cherries and water. This flow forces the water already in the system from the drums through the pipes 20, 22, 24, 26 and 28, the heater 30 and pipe 34 into the kettle or chamber 10. Any excess water in the system and that replaced in the cherries overflows through the pipe 36 at the level indicated.

As the circulation continues, the sugar solution becomes progressively more concentrated. For example, during a run, the sugar solution returning to the chamber 10 through pipe 34 is only about 1½ to 2% lower in sugar content than that of the solution flowing down through the pipe 12. In the course of a run of from about 2 to 3 weeks for the production of maraschino cherries, the solution flowing through the pipe 12 finally reaches a concentration of about 50% sugar. Over the whole period of a run, the cherries in the drums have a sugar concentration only 2% or less below the concentration of the reinforcing syrup flowing to the drums 18 from the chamber 10.

The sugar syrup flow is continuous, rapid and level throughout the system. For example, the rate of flow through the pipe 34, a 2 inch I.D. pipe, is approximately 100 gallons per hour. As the circulation proceeds during a run, the sugar is replenished on the screen 46, and the overflow takes off the water and syrup displaced by the added sugar. During the whole period of the run, there is a continuous flow with the heaviest syrup finding its way to the bottom of the system in the drums where the cherries are located, displacing water driven off, as well as lighter syrup which rises to flow back through the heater 30 and drum 10, the excess flowing out of the system into tanks through the overflow 36.

The heater 30 warms the syrup returning to the kettle or chamber 10 to a temperature of about 140° F. This heating releases the air dissolved by the water or syrup from the cherries. The warm water or syrup flowing from the heater into the kettle or chamber 10 facilitates the dissolving of sugar from that on the screen 46. The heater 30 has only a small capacity, and is not intended to and does not heat the cherries at all, since by the time the syrup is mixed in the chamber 10 and travels the distance to the drums 18, at the rate of circulation, the syrup is cooled to room temperature.

The heating of the syrup at a particular point in the system, followed by the removal of air from the syrup, gives the syrup an increased capacity to dissolve more air as it cools and returns to the layers of cherries in the drums. The cool, reinforced syrup returning to the cherries in the drums dissolves any air which may be trapped either in the pit cavities or in the cellular tissues of the cherries. As the warm syrup gives off its air, when it is delivered into the chamber 10, a layer of foam is formed on the top of the solution in the kettle, which persists for about six days during the run. After the air in the cherries has been completely removed, the foam on the kettle subsides and the syrup becomes crystal clear. The processing continues for the entire run, gradually and imperceptibly increasing the sugar concentration without heating or crushing the cherries in the drums.

At the end of the run, the drums of maraschino cherries are stood upright and disconnected from the system. The drum heads 39 and connections are removed, the removable dividers are pulled out and the drums of finished cherries, together with the syrup content are sealed up with standard drum heads ready for weighing and shipping.

The deposition of the sugar in the cherries and the circulation takes place automatically, and the syrup in contact with the cherries in the drums replaces the moisture or water content of the cherries with the sugar solution. This replaced water dilutes the syrup moving upwardly in each drum, so that automatic flow in the system is achieved because of the lower density of the solution in the lines 20, 22, 24, 26 and 28 and heating chamber 30 than in the lines 12, 14 and 16. In each drum the saturated sugar solution flows down along the inclined bottom of the drum and diffuses upwardly through the cherries in the lower compartment, then through the lower perforated shelf and the layer of cherries in the intermediate compartment and finally through the upper perforated shelf and the layer of cherries in the upper compartment of the drum. The perforated plate shelves 40 and 42 provide three relatively thin layer-like bodies of cherries in each drum, thereby facilitating distribution of the syrup upwardly through the layers of cherries and preventing crushing and matting of the cherries.

The heating of the solution in the chamber 30 to a temperature of from 130 to 140° F. not only releases the air content of the solution but decreases the density of the column flowing toward the chamber 10. While the heating in the chamber 30 may be discontinued after the solution becomes clear in the chamber 10, it is, however, preferably continued to facilitate the flow by increasing the difference in specific gravity of the two columns of liquid in the system. After the process is once initiated, it requires no attention whatever for the full period of the run, except to occasionally empty a 100 lb. bag of granulated sugar onto the screen 46.

*Example*

In a specific example of an operation for the production of maraschino cherries, seventeen (17) drums of cherries were connected into the connecting lines of the system, in which the liquid level in the chamber 10 was 15 feet above the bottoms of the drums 18. The cherries used in this run were pretreated in the usual manner for the production of maraschino cherries, including the treatment with sulphur dioxide brine, the pitting of the cherries and final washings to produce clean cherries free of sulphur dioxide. The cherries subjected to the process after pretreatment contained no sugar and they were drained and filled into the drums after inserting the perforated shelves. Each drum was filled with 367 lbs. of drained cherries for a total of 6,239 lbs. for the run.

After the seventeen (17) filled drums were connected into the lines, the system, including the drums, was filled with water and the cherries were processed for a period of 12 days in accordance with the procedure described above. At the end of that time the maraschino cherries produced in the drums were weighed, giving a total weight of 7,286 lbs. for a net gain of 1,047 lbs., or a gain of approximately 16½%. The sugar solids content of the cherries was approximately 45%, and the cherries were round, plump and firm and had an excellent appearance and color. The texture of the cherries was crisp, firm and tender.

The net gain of approximately 16%, as reported in the above example, is in contrast to the usual increase of only a few percent in conventional processes of manufacturing maraschino cherries, in which a processing period of about 6 weeks is used. The increased yield obtained and the exceptional quality of the maraschino cherries produced may be the result of the combination of conditions employed, particularly the effective removal of air from the fruit in the initial stages of the process and the use of an air-free solution for syruping the fruit. The heating of the solution returning to the chamber 10 from 130 to 150° F. effectively removes the air content of the returning solution, and the solution in the chamber 10 is maintained in a quiet unagitated condition so that no air is taken up in dissolving the sugar. The heated solution is at the top of the chamber and therefore eddying currents in the chamber are avoided. At the same time the sugar dissolves gradually in the warm solution at the top of the chamber and gravitates slowly as circulation proceeds. The air content of the cherries including that in the tissues is effectively removed, thereby increasing the tissue space available for receiving the sugar solids from the solution.

The pressure effects achieved in the system in connection with the temperatures and syrup concentrations employed are also regarded as important in obtaining the results reported above. In the first instance there is the osmotic pressure of the sugar solution applied against the tissues of the fruit. In the process this pressure is kept low by slowly and imperceptibly increasing the strength of the syrup at a rate natural to the cherries, so that the sugar solids content of the cherries is never more than 2% behind that of the syrup brought in contact with the cherries. The tissues of the cherries are, therefore, not broken and the cherry structure is maintained. In the second place there is a pressure effect caused by the buoyancy of the cherries in the syrup, particularly in the initial stages of the process when the cherries have a considerable content of air, not only in the pit cavities, but in their tissues. This pressure effect is almost entirely avoided by the early removal of air and to some extent by the layering of the cherries in the drums, so that the depth of cherries is never more than 8 inches, and usually less. The very small difference of only about 2% in sugar solids between the syrup and cherries also reduces the buoyancy, which might be very great where there is a great differential between the sugar solids in the cherries and syrup.

The air in the cherries, particularly in the initial stages of the operations tends to increase the buoyancy of the cherries which might under other circumstances cause them to float to the top of the layer, but the liquid column in the system, for example 15 feet high, creates a pressure effect of approximately 7 lbs. above atmospheric pressure in the drums. This compresses the air initially in the cherries, so that the volume is greatly reduced and correspondingly reduces the buoyancy of the cherries. The air in the cherries is gradually dissolved and replaced in the manner described above by the air-free syrup penetrating the cherries. The process is a gentle osmotic exchange which least affects the cells and tissues of the cherries. Although the process is gentle, it is so thorough, rapid and complete in removing the air from the cavities and cell tissues that the finished cherries appear translucent as though candied. However, no heat had been applied in the process.

Experience in the operation of the process has shown that an increase in weight of approximately 16% is obtainable for cherries processed to between 45 and 50% sugar, while cherries processed to higher sugar contents show correspondingly higher yields.

It is to be understood that the process of the present invention may be carried out in apparatus somewhat differently arranged from that described, so long as the pressure, temperature and air removal features are employed in connection with the differential gravity flow system. However, the drums with removable heads are preferably used because of the convenience in handling, charging and preparing for shipment.

I claim:

1. An apparatus for syruping fruits for the production of preserved fruits comprising a solution chamber, a plurality of drums for holding the fruit to be syruped, means for conducting syrup in parallel from the lower portion of the solution chamber to the lower portion of the drums, a syrup heater, means for conducting syrup from the upper portion of the drums in parallel into the heater, a screen in the upper portion of the solution chamber for receiving granulated sugar, and means for conducting heated syrup from the syrup heater into the upper portion of the solution chamber.

2. An apparatus for the manufacture of preserved fruits containing deposited sugar, in which the fruit after being prepared for syruping is contacted with a sugar solution to deposit sugar in the fruit, the apparatus comprising a solution chamber for producing and holding a sugar solution, a plurality of drums arranged in parallel for holding bodies of fruit, means connecting the drums in parallel for syrup flow from and the solution chamber including means for conducting streams of solution in parallel from the solution chamber to the bottoms of the drums thereby causing it to flow upwardly through the bodies of fruit therein to dissolve air and moisture from the fruit, said conducting means also including means for passing streams of solution from the upper portions of the drums and delivering the solution into the upper portion of the body of solution in the solution chamber, means for heating the solution flowing from the drums to the solution chamber, and means dividing each drum into a plurality of superposed compartments each for holding a relatively shallow body of fruit.

3. An apparatus for the manufacture of preserved fruits containing deposited sugar, in which the fruit after being prepared for syruping is contacted with a sugar solution to deposit sugar in the fruit, the apparatus comprising a solution chamber for producing and holding a sugar solution, a container for holding a body of fruit to be syruped, means connecting the lower portion of the container with the lower portion of the chamber for conducting a stream of sugar solution from the chamber to the container, means for conducting sugar solution from the upper portion of the container into the upper portion of the solution chamber, and means for heating the sugar solution flowing from the container to the solution chamber for the liberation of air from the solution flowing to the solution chamber.

4. An apparatus as claimed in claim 3, in which the solution chamber is located at an elevation higher than that of the fruit container sufficiently to provide a pressure head approximately seven pounds per square inch in the fruit container.

5. An apparatus as claimed in claim 3, in which the container is a drum mounted approximately horizontal, and a grid structure located in the drum comprising spaced perforated plates dividing the drum into superposed compartments for holding fruit.

6. An apparatus for the manufacture of preserved fruits containing deposited sugar, in which the fruit after being prepared for syruping is contacted with a sugar solution to deposit sugar in the fruit, the apparatus comprising a solution chamber for producing and holding a sugar solution, a plurality of drums arranged in parallel for holding bodies of fruit, a pair of headers respectively connected into the upper and lower portions of the solution chamber, a solution flow connection connecting the upper portion of each drum with the header connected into the upper portion of the solution chamber, a solution flow connection connecting the lower portion of each drum with the header connecting the lower portion of each drum with the header connected into the lower portion of the solution chamber, a valve in each of said connections, and said solution flow connections being readily connectable and disconnectable from the drums.

7. An apparatus as claimed in claim 6, in which each drum is provided with a readily removable head through which the connections for the drum extend.

References Cited in the file of this patent
UNITED STATES PATENTS

| | | |
|---|---|---|
| 66,208 | Brooks | July 2, 1867 |
| 2,236,692 | Neil | Apr. 1, 1941 |
| 2,785,071 | Mathews | Mar. 12, 1957 |

UNITED STATES PATENT OFFICE

CERTIFICATE OF CORRECTION

Patent No. 3,086,445 April 23, 1963

Dean J. Limpert

It is hereby certified that error appears in the above numbered patent requiring correction and that the said Letters Patent should read as corrected below.

Column 3, line 28, for "mount" read -- mound --; column 6, line 56, after "and" insert -- to --; column 8, lines 8 and 9, strike out "connecting the lower portion of each drum with the header".

Signed and sealed this 12th day of November, 1963.

(SEAL)
Attest:
ERNEST W. SWIDER

EDWIN L. REYNOLDS

Attesting Officer

Acting Commissioner of Patents